United States Patent
Liu et al.

(10) Patent No.: US 12,301,463 B2
(45) Date of Patent: May 13, 2025

(54) PACKET FLOW SAMPLING IN NETWORK MONITORING

(71) Applicant: Cisco Technology, Inc., San Jose, CA (US)

(72) Inventors: Jianda Liu, Shanghai (CN); Xiaorong Wang, Shanghai (CN); Yicheng Liu, Shanghai (CN); Hongbo Xia, Shanghai (CN); Wei Zhou, Changsha (CN)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 17/977,953

(22) Filed: Oct. 31, 2022

(65) Prior Publication Data

US 2024/0064103 A1 Feb. 22, 2024

Related U.S. Application Data

(60) Provisional application No. 63/397,106, filed on Aug. 11, 2022.

(51) Int. Cl.
*G06F 15/16* (2006.01)
*H04L 43/0876* (2022.01)
*H04L 47/215* (2022.01)

(52) U.S. Cl.
CPC ........ *H04L 47/215* (2013.01); *H04L 43/0876* (2013.01)

(58) Field of Classification Search
None
See application file for complete search history.

(56) References Cited

U.S. PATENT DOCUMENTS

| | | | |
|---|---|---|---|
| 8,976,658 B1 | 3/2015 | Kondapalli | |
| 9,203,767 B1 | 12/2015 | Al-Banna et al. | |
| 11,106,442 B1* | 8/2021 | Hsiao | G06F 11/324 |
| 11,977,513 B2* | 5/2024 | Jiang | G06F 16/183 |
| 2006/0209696 A1 | 9/2006 | Walker et al. | |
| 2009/0003204 A1* | 1/2009 | Okholm | H04L 69/12 370/230 |
| 2010/0322071 A1* | 12/2010 | Avdanin | H04L 47/215 370/230 |
| 2011/0242994 A1 | 10/2011 | Carvalho et al. | |
| 2018/0241677 A1* | 8/2018 | Srebro | H04L 47/6275 |
| 2019/0268270 A1 | 8/2019 | Fattah | |
| 2020/0274819 A1* | 8/2020 | Nahum | H04L 47/2441 |

* cited by examiner

*Primary Examiner* — Phuoc H Nguyen
(74) *Attorney, Agent, or Firm* — Lee & Hayes, P.C.

(57) ABSTRACT

This disclosure describes techniques and mechanisms for intelligently sampling packet flows within a network. The techniques enable the sampling of a limited set of packet flows that show greatest amount of information about the network from the packet flows in order to provide the greatest insight on application performance, network packet, and critical events within the network. Additionally, the techniques provide configurable parameters, such that the techniques are customizable for each user's network.

20 Claims, 5 Drawing Sheets

PACKET FLOW SAMPLING IN NETWORK MONITORING

CROSS REFERENCE TO RELATED APPLICATIONS

This application claims priority to U.S. Provisional Patent Application No. 63/397,106, filed Aug. 18, 2022, the entire contents of which are incorporated herein by reference.

TECHNICAL FIELD

The present disclosure relates generally to the field of computer networking, and more particularly to providing intelligent packet flow sampling in network monitoring.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Network administrators may want to monitor a network. Accordingly, two techniques exist to monitor network(s). First, a system may monitor all of the packet flow (e.g., transactions in the network) according to the TCP protocol. For instance, where a network administrator wants to monitor the bandwidth of a specific target, for example an application, you'll have to monitor all packet flows belong to that target. However, a lot of packet flows may "act" the same way from a network perspective, such that monitoring all packet flows is duplicative and resource intensive. The second technique is to sample packet flows. For instance, if a network administrator just wants to monitor metrics like latency, jitter and ART, a sampling of the packet flows can be taken, and the value measured by sampled packet flows may be used as approximation of the value for entire target. Accordingly, sampling techniques may allow a network administrator to select specific packet flows. In order to sample packet flows, rules must be selected. However, the kinds of rules selected by an administrator can result in sampling that is inaccurate and may not adequately represent the network.

Accordingly, there is a need for an intelligent sampling mechanism that provides the greatest amount of information about a network, while being flexible and restrained to a resource limit.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
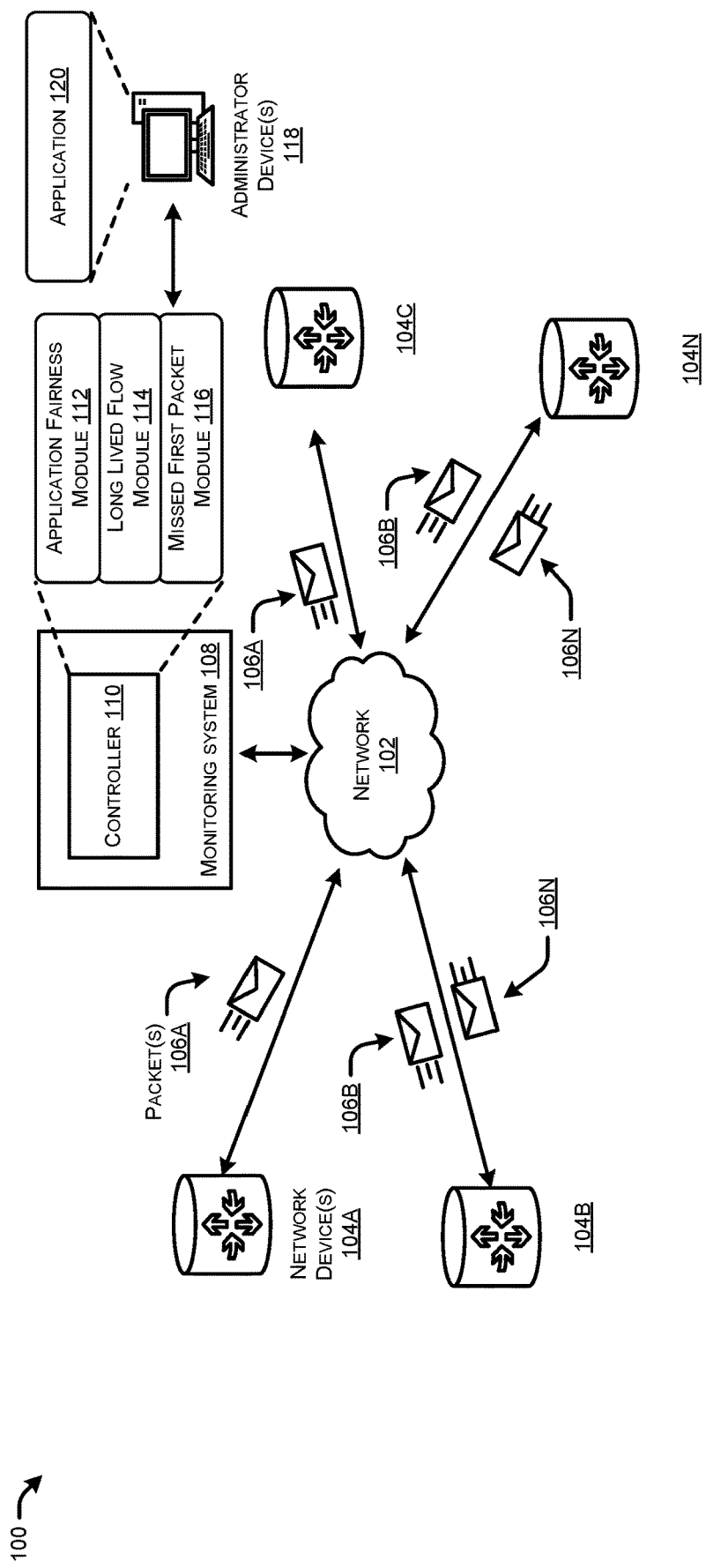
FIG. 1 illustrates a system-architecture diagram of an environment in which a system can intelligently sample packet flow within a network.

The present disclosure relates generally to the field of computer networking, and more particularly to providing intelligent packet flow sampling in network monitoring.

A method to perform the techniques described herein may be implemented by a network device with a network that monitors packet flow and may include receiving a packet associated with a packet flow within the network. Additionally, the method may include determining that the packet is not associated with a token. The method may also include determining that a token bucket associated with the packet flow comprises tokens above a threshold amount of tokens. Further, the method may include assigning the token to the packet flow.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Network administrators may want to monitor a network. Accordingly, two techniques exist to monitor network(s). First, a system may monitor all of the packet flow (e.g., transactions in the network) according to the TCP protocol. In some examples, a packet flow may comprise a plurality of packets. For instance, where a network administrator wants to monitor the bandwidth of a specific target, for example an application, you'll have to monitor all packet flows belong to that target. However, a lot of packet flows may "act" the same way from a network perspective, such that monitoring all packet flows is duplicative and resource intensive. The second technique is to sample packet flows. For instance, if a network administrator just wants to monitor metrics like latency, jitter and ART, a sampling of the packet flows can be taken, and the value measured by sampled packet flows may be used as approximation of the value for entire target. Accordingly, sampling techniques may allow a network administrator to select specific packet flows. In order to sample packet flows, rules must be selected. However, the kinds of rules selected by an administrator can result in sampling that is inaccurate and may not adequately represent the network.

Accordingly, there is a need for an intelligent sampling mechanism that provides the greatest amount of information about a network, while being flexible and restrained to a resource limit.

This disclosure describes techniques and mechanisms for a monitoring system to intelligently sample packet flows in order to provide the greatest network insight to a network administrator. In some examples, a packet flow may be associated with an application. In some examples, a packet flow may comprise a plurality of packets. In some examples, the system may receive a packet associated with a packet flow within the network, determine that the packet is not associated with a token; determine that a token bucket associated with the packet flow comprises tokens above a threshold amount of tokens; and assign the token to the packet flow.

In some examples, the system utilizes a flow sampling algorithm. In some examples, the flow sampling algorithm is based at least in part on a token bucket. Generally, where a device in a network is configured to perform a sampling of packet flows, the device may be assigned a fixed number of tokens in a token bucket. In some examples, the number of tokens represent the maximum capability of concurrent packet flows that can be monitored by the device, hence the overall compute resource used by network monitor is restrained. In some examples, the number of tokens in a token bucket may be represented by N. When the device receives a packet associated with a packet flow, the device may decide (e.g., via a monitoring system) that the packet flow should be monitored. In this example, the device identifies that it will need to take M tokens from the device's token bucket and associate those M tokens with the packet flow. Once the packet flow is finished (e.g., for example, when a TCP packet flow is finished, a FIN flag is included in TCP header of its last packet), the packet flow will return M tokens back to device's token bucket. Traditionally, when the device's token bucket runs out of tokens and/or the number of tokens falls below a threshold number of tokens, packet flow sampling may stop and no new packet flow may be monitored until a previous monitored packet flow return its token back.

In some examples, in order to apply intelligence to the packet flow sampling algorithm, the system may incorporate an application fairness module, a long lived flow module, and/or a missed first packet module. In some examples, the application fairness module is configured to enable the system to monitor as many applications as possible in the network, regardless of bandwidth usage of each application. For instance, some applications (e.g., such as smaller applications) may comprise less packet flows than other applications, which can lead to the smaller applications being ignored during sampling with a single token bucket. In order to address this problem, the system may comprise multiple token buckets. For instance, the system may separate the total N tokens into L small token buckets, where each token bucket is assigned N/L token(s). In some examples, the application fairness module is configured to determine the hash value of each packet flow the system receives. In some examples, the hash value is based at least in part on the packet flow's attributes (e.g., packet flow tuple, application, etc.). In some examples, the application fairness module may assign, based at least in part on the hash value, the packet flow to a particular token bucket, such that the packet flow may only receive token(s) from the assigned token bucket. In some examples, where there are enough token(s) in the particular token bucket, the packet flow may be sampled. In other examples, such as where there are not enough token(s) in the particular token bucket, the packet flow may not be sampled and/or another module (e.g., such as the missed first packet module) may be applied.

By utilizing multiple token buckets and assigning packet flows to token buckets based on a hash value, packet flows belong to different applications will compete for tokens within their designated token buckets. Therefore, applications with fewer packet flows may have a higher opportunity to be sampled, resulting in improved diversity of packet flow sampling compared to existing sampling mechanisms.

In some examples, the long lived flow module may be utilized by the sampling algorithm. For instance, packet flows may be characterized by the "living time" of the packet flow. For example, opening a web page or web browser may represent short lived packet flows whereas starting a SSH connection to a Linux server may represent a long lived packet flow. Generally, any packet flow that "lives" longer than T seconds may be defined as a long lived flow. Any packet flow that is shorter than T may be defined as a short lived packet flow. In most sampling algorithms, long lived packet flows have a higher possibility of being sampled than short lived packet flows, and once a long lived packet flow is sampled, it will hold its token(s) for longer time, leaving less tokens for short lived packet flows to take.

In order to address this problem, the long lived flow module takes into account that long lived packet flows may consume less resources (and therefore will need fewer tokens) after time T seconds. For instance, in the first T seconds (e.g., 20 second, 60 seconds, etc.), the packet flow may need 10 tokens (e.g., in order to create a packet flow record and collect information about packet flow attributes). However, after the T seconds (e.g., after 60 seconds, etc.), the packet flow may be designated as a long lived packet flow and will only need to update statistics for the packet flow, thereby consuming less resources (e.g., and therefore will need fewer tokens). Accordingly, the long lived flow module may assume a long lived packet flow will consume K % of the resource consumed by the packet flow in first T seconds, it should return (M×(1−K %)) number of tokens to token bucket by time T seconds. In some examples, if multiple long lived flows returned its extra token, the long lived flow module may sample new packet flows when remaining token greater than M. In some examples, the number of active packet flows being sampled may range from (N/M) to (N/(M×K %)), with the system resource usage unchanged. Thus, the long lived flow module may enable more short lived packet flows to be sampled by utilizing an elastic limit.

In some examples, the sampling algorithm may utilize the missed first packet module. For instance, the system may miss a first packet of a packet flow where (1) the packet flow already exists when we start networking monitoring or (2) when the first packet of the packet flow arrives, the system doesn't have enough tokens in the assigned token bucket to sample it. Since the first packet of a packet flow contains valuable information and provides a complete view of the packet flow (e.g., instructions for setting up a cache, instructions for handling the packet flow, packet flow attributes, etc.), the missed first packet module may be configured to give higher precedence to packet flows where the missed first packet module determines the packet is the first packet in the packet flow. For instance, the missed first packet module may be applied where the number of tokens in a particular token bucket are exhausted (e.g., determined to be below a threshold number of tokens) and the number of token(s) is greater than zero. In this example, the missed first packet module may start a timer for a particular time period, F seconds, (e.g., 10 seconds, 30 seconds, etc.). During the time period, the missed first packet module may be configured to not allow a packet flow to be sampled (e.g., assigned tokens) where the first packet in the packet flow is missed. Where the first packet in the packet flow is received by the system, the missed first packet module may allow the packet flow to be sampled where there are enough tokens in the assigned token bucket.

In some examples, one or more of the variables utilized by the sampling algorithm (N, M, K, T, F, etc.) may be configurable by a user. Accordingly, by enabling a user to adjust one or more parameters of the sampling algorithm, the system provides a customizable intelligent monitoring system that users can customize to their network.

In this way, the system can implement a token bucket-based packet flow sampling mechanism, which may always retrain system resource usage to a certain limit, thereby restraining the system to a resource limit. Moreover, the system utilizes intelligence in conjunction with the token bucket to (1) ensure the diversity of monitored applications, (2) allow more short-lived packet flows been sampled with elastic limit (3) and give higher precedence to packet flows who can be monitored completely. Accordingly, the described techniques may maximize the insights about application performance, network path(s), and critical events (e.g., network outages, service disruptions, etc.) happening in the network that are retrieved from packet flows sampled by network monitoring. Further, the described techniques may enable users (e.g., network administrators, etc.) to adjust the rules and/or parameters to meet the requirements of different scenarios, thereby enabling the system to be customized to a user's network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can intelligently sample packet flow within a network. While the system 100 shows an example monitoring system 108 and controller 110, it is understood that any of the components of the system may be implemented on any device in the network 102. Further, while the monitoring system 108 is illustrated as operating out-of-band, it is understood that the monitoring system 108 may operate in-band.

In some examples, the system 100 may include a network 102 that includes network devices. The network 102 may include one or more networks implemented by any viable communication technology, such as wired and/or wireless modalities and/or technologies. The network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a monitoring system 108. In some examples, the monitoring system 108 corresponds to a system that has complete visibility into the security fabric of a given network (e.g., enterprise network, smaller network, etc. In some examples, the monitoring system 108 may comprise a controller 110. For instance, the controller 110 may be configured to communicate with an administrator device(s) 118 to receive packet(s) 106 associated with packet flow(s). In some examples, the packet(s) 106 may comprise data (e.g., which application is used, by which station, traffic characteristics and duration, etc.) associated with network traffic and may store the data as part of the system and/or monitoring system 108 (e.g., such as in a database and/or memory associated with the monitoring system 108). As illustrated, the administrator device(s) 118 may comprise an application 120. In some examples, the application 120 may correspond to an application provided by a service provider (e.g., such as Cisco) that enables an administrator of the network 102 to access the change window planner 104 and/or any other service(s).

In some examples, the monitoring system 108 and/or controller 110 may be integrated as part of Cisco's Network Wide Path Insight feature and/or included in a SD-WAN architecture. In some examples, the Network Wide Path Insight feature may comprise one or more pre-trained models and/or pre-trained weighted models. In some examples, the artificial intelligence models are pre-trained using machine learning techniques. In some examples, the change window system may store machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), regression models, unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs.

The monitoring system 108 and/or controller 110 may be configured to communicate with one or more network device(s) 104. For instance, as noted above the monitoring system 108 and/or controller 110 may receive network data (e.g., network traffic load data, network client data, etc.) or other data (e.g., application load data, data associated with WLCs, APs, etc.) from the network device(s) 104. The network device(s) 104 may comprise routers, switches, access points, stations, radios, or any other network device. In some examples, the network device(s) 104 may monitor packet flow(s) within the network and may report information associated with the packet flow(s) to the monitoring system 108 and/or the controller 110.

In some examples, the monitoring system 108 and/or controller 110 may utilize token bucket(s) and/or a sampling algorithm. As described above the monitoring system 108 and/controller 110 may divide a total number of N tokens into L smaller token buckets. As illustrated in FIG. 1, the monitoring system 108 and/or controller 110 may comprise an application fairness module 112. As described above, the application fairness module may 112 be configured to determine the hash value of each packet and/or packet flow the monitoring system 108 and/or controller 110 receives. In some examples, the hash value is based at least in part on the packet flow's attributes (e.g., packet flow tuple, application, etc.). In some examples, the application fairness module 112 may assign, based at least in part on the hash value, the packet flow to a particular token bucket, such that the packet flow may only receive token(s) from the assigned token bucket.

In some examples, the monitoring system 108 and/or controller 110 may comprise a long-lived flow module 114. As described above, the long lived flow module 114 may be configured to take into account that long lived packet flows may consume less resources (and therefore will need fewer tokens) after time T seconds. In some examples, the long lived flow module 114 may be configured to assume a long lived packet flow will consume K % of the resource consumed by the packet flow in first T seconds, it should return $(M \times (1-K\%))$ number of tokens to token bucket by time T seconds. In some examples, if multiple long lived flows returned its extra token, the long lived flow module may be configured to sample new packet flows when remaining tokens are greater than M (e.g., a threshold number). In some examples, the number of active packet flows being sampled may range from $(N/M)$ to $(N/(M \times K\%))$, with the system resource usage unchanged. Thus, the long lived flow module 114 may enable more short lived packet flows to be sampled by utilizing an elastic limit.

In some examples, the monitoring system 108 and/or controller 110 may comprise a missed first packet module 116. As described above, the missed first packet module 116 may be configured to give higher precedence to packet flows where the missed first packet module 116 determines the packet is the first packet in the packet flow. For instance, the missed first packet module 116 may be applied where the number of tokens in a particular token bucket are exhausted (e.g., determined to be below a threshold number M of tokens) and the number of token(s) is greater than zero. In this example, the missed first packet module 116 may start a timer for a particular time period. F seconds, (e.g., 10 seconds, 30 seconds, etc.). During the time period, the missed first packet module 116 may be configured to not allow a packet flow to be sampled (e.g., assigned tokens) where the first packet in the packet flow is missed. Where the first packet in the packet flow is received by the system, the missed first packet module 116 may allow the packet flow to be sampled where there are enough tokens in the assigned token bucket.

At "1", the system may receive packet(s) associated with packet flow(s). As indicated above, a packet flow may represent a transaction within the network. In some examples, the packet may comprise information about the network (e.g., traffic information, etc.). For instance, where a packet is a first packet in the packet flow, the first packet may comprise additional information (e.g., such as instructions for setting up a cache for the packet flow, etc.).

At "2", the system may determine whether the packet(s) are assigned token(s). For instance, the system may determine whether the packet flow associated with the packet has already been sampled.

At "3", the system may determine whether token bucket(s) associated with the packet flow(s) are exhausted. For instance, the system may determine whether the token bucket(s) contain fewer than a threshold number of tokens and whether the number of token(s) is greater than zero. As noted above, the threshold number of tokens may be automatically set by the system and/or customized by a network administrator.

At "4", the system may apply one or more of the module(s). For instance, the system may apply one or more of the application fairness module, the long lived flow module, and/or the missed first packet module described above.

In this way, the system can implement a token bucket-based packet flow sampling mechanism, which may retrain system resource usage to a certain limit, thereby restraining the system to a resource limit. Moreover, the system utilizes intelligence in conjunction with the token bucket to (1) ensure the diversity of monitored applications, (2) allow more short-lived packet flows been sampled with elastic limit (3) and give higher precedence to packet flows who can be monitored completely. Accordingly, the described techniques may maximize the insights retrieved from packet flows sampled by network monitoring. Further, the described techniques may enable users (e.g., network administrators, etc.) to adjust the rules and/or parameters to meet the requirements of different scenarios, thereby enabling the system to be customized to a user's network.

Figure 2:
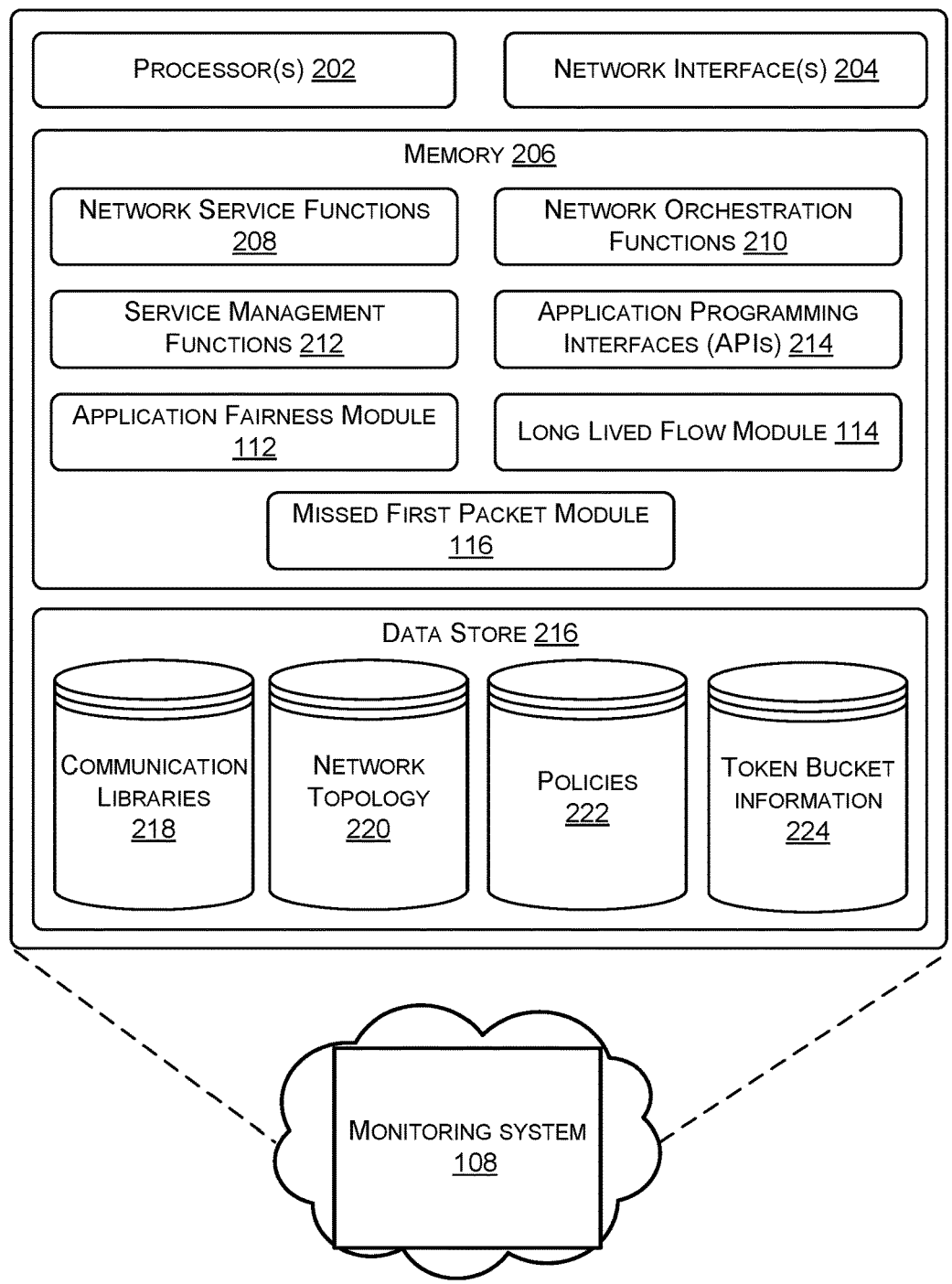
FIG. 2 illustrates a component diagram of an example monitoring system described in FIG. 1.

FIG. 2 illustrates a component diagram of an example monitoring system described in FIG. 1. In some instances, the monitoring system 108 may run on one or more computing devices in, or associated with, the network 102 (e.g., a single device or a system of devices). In some instances, the monitoring system 108 may be integrated as part of a cloud-based management solution (e.g., such as Cisco's Network Wide Path Insight feature).

Generally, the monitoring system 108 may include a programmable controller that manages some or all of the control plane activities of the network 102, and manages or monitors the network state using one or more centralized control models.

As illustrated, the monitoring system 108 may include, or run on, one or more hardware processors 202 (processors), one or more devices, configured to execute one or more stored instructions. The processor(s) 202 may comprise one or more cores. Further, the monitoring system 108 may include or be associated with (e.g., communicatively coupled to) one or more network interfaces 204 configured to provide communications with the edge device(s) 124 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), and so forth. For example, the network interfaces 204 may include devices compatible with any networking protocol.

The monitoring system 108 may also include memory 206, such as computer-readable media, that stores various executable components (e.g., software-based components, firmware-based components, etc.). The memory 206 may generally store components to implement functionality described herein as being performed by the monitoring system 108. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the monitoring system 108.

The monitoring system 108 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the monitoring system 108 may include an application fairness module 12. As described above, the application fairness module is configured to enable the system to monitor as many applications as possible in the network, regardless of bandwidth usage of each application. For instance, some applications (e.g., such as smaller applications) may comprise less packet flows than other applications, which can lead to the smaller applications being ignored during sampling with a single token bucket. In order to address this problem, the system may comprise multiple token buckets. For instance, the system may separate the total N tokens into L small token buckets, where each token bucket is assigned N/L token(s). In some examples, the application fairness module is configured to determine the hash value of each packet flow the system receives. In some examples, the hash value is based at least in part on the packet flow's attributes (e.g., packet flow tuple, application, etc.). In some examples, the application fairness module may assign, based at least in part on the hash value, the packet flow to a particular token bucket, such that the packet flow may only receive token(s) from the assigned token bucket. In some examples, where there are enough token(s) in the particular token bucket, the packet flow may be sampled. In other examples, such as where there are not enough token(s) in the particular token bucket, the packet flow may not be sampled and/or another module (e.g., such as the missed first packet module) may be applied.

By utilizing multiple token buckets and assigning packet flows to token buckets based on a hash value, packet flows belong to different applications will compete for tokens within their designated token buckets. Therefore, applications with fewer packet flows may have a higher opportunity to be sampled, resulting in improved diversity of packet flow sampling compared to existing sampling mechanisms.

The monitoring system 108 may include a long lived flow module 114. In some examples, the long lived flow module 114 takes into account that long lived packet flows may consume less resources (and therefore will need fewer tokens) after time T seconds. For instance, in the first T seconds (e.g., 20 second, 60 seconds, etc.), the packet flow may need 10 tokens (e.g., in order to create a packet flow record and collect information about packet flow attributes). However, after the T seconds (e.g., after 60 seconds, etc.), the packet flow may be designated as a long lived packet flow and will only need to update statistics for the packet flow, thereby consuming less resources (e.g., and therefore will need fewer tokens). Accordingly, the long lived flow module may assume a long lived packet flow will consume K % of the resource consumed by the packet flow in first T seconds, it should return (M×(1−K %)) number of tokens to token bucket by time T seconds. In some examples, if multiple long lived packet flows returned its extra token, the long lived flow module may sample new packet flows when remaining token greater than M. In some examples, the number of active packet flows being sampled may range from (N/M) to (N/(M×K %)), with the system resource usage unchanged. Thus, the long lived flow module may enable more short lived packet flows to be sampled by utilizing an elastic limit.

The monitoring system 108 may include a missed first packet module 116. As described above, the missed first packet module 116 may be configured to give higher precedence to packet flows where the missed first packet module 116 determines the packet is the first packet in the packet flow. For instance, the missed first packet module 116 may be applied where the number of tokens in a particular token bucket are exhausted (e.g., determined to be below a threshold number of tokens) and the number of token(s) is greater than zero. In this example, the missed first packet module 116 may start a timer for a particular time period, F seconds, (e.g., 10 seconds, 30 seconds, etc.). During the time period, the missed first packet module 116 may be configured to not allow a packet flow to be sampled (e.g., assigned tokens) where the first packet in the packet flow is missed.

Where the first packet in the packet flow is received by the system 100, the missed first packet module may allow the packet flow to be sampled where there are enough tokens in the assigned token bucket.

The monitoring system 108 may further include a data store 216, such as long-term storage, that stores communication libraries 218 for the different communication protocols that the monitoring system 108 is configured to use or perform. Additionally, the data store 218 may include network topology data 220, such as a model representing the layout of the network components in the network 102 and/or data indicating available bandwidth, available CPU, delay between nodes, computing capacity, processor architecture, processor type(s), etc. The data store 216 may store policies 222 that includes security data associated with the network, security policies configured for the network, and/or compliance policies configured for the network. Additionally, the data store 216 may include token bucket information 224 (e.g., associations between token(s) and packet flow(s), packet flow information, number of token(s) available to a particular token bucket, etc.) as described above.

Figure 3:
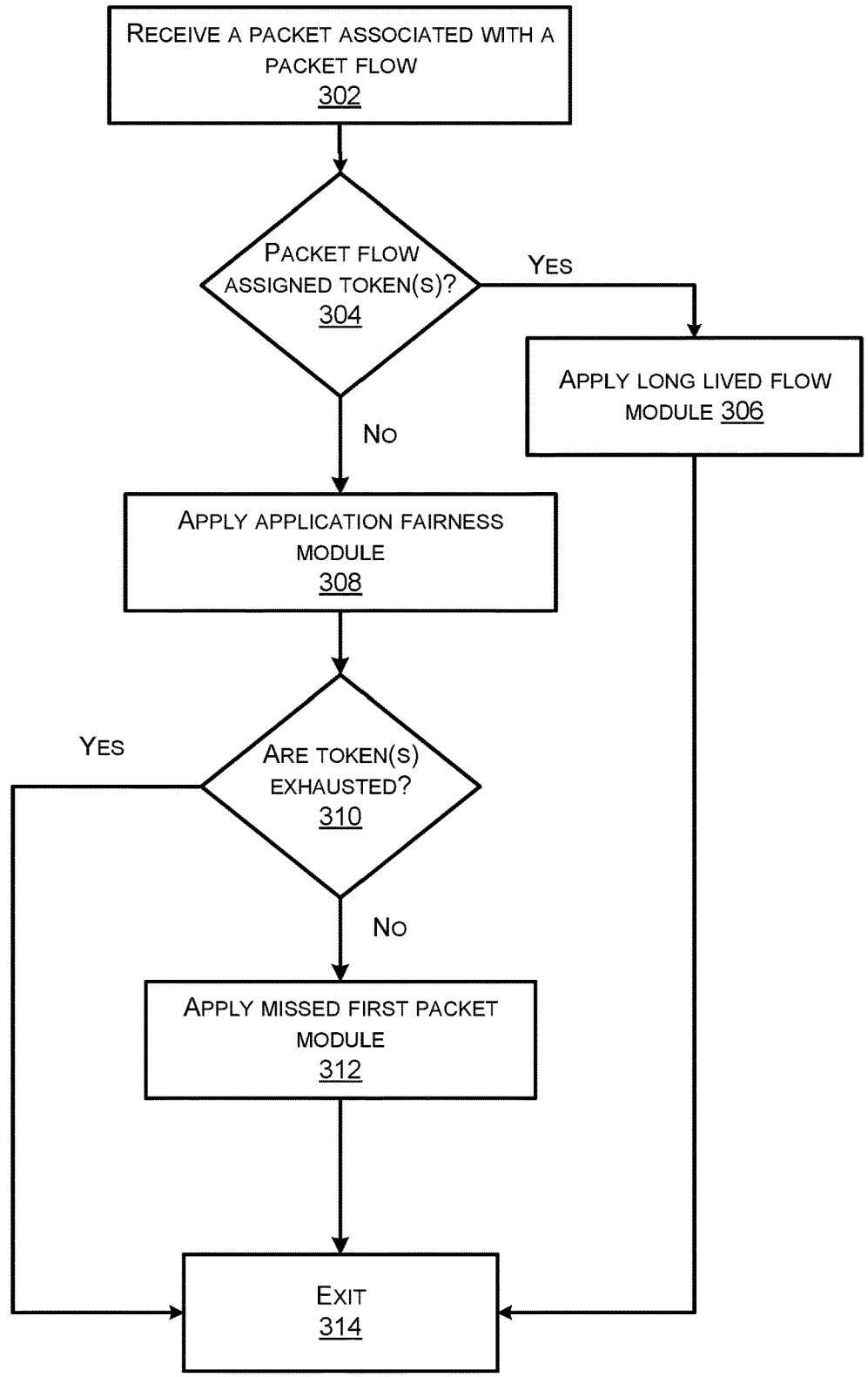
FIG. 3 illustrates an example intelligent sampling algorithm associated with the system described in FIGS. 1 and 2.

FIG. 3 illustrates an example method for implementing an intelligent sampling algorithm 300 associated with the system. In some examples, the algorithm 300 may be implemented at the monitoring system 108, the controller 110, and/or any device within the network 102. In some examples, the algorithm 300 may be implemented by any network device in a SD-WAN architecture. In some examples, the algorithm 300 may be implemented as part of Cisco's Network-wide Path Insight feature.

At 302, the system determines that a packet associated with a packet flow is received. As described above, a packet flow may comprise a plurality of packets. In some examples, the packet flow is associated with an application.

At 304, the system determines whether the packet flow has already been assigned one or more token(s). For instance, the system may determine whether an association exists between the packet flow associated with the packet and one or more tokens of a particular token bucket. As noted above, the system may identify this association in memory and/or a database of the system.

Where the system determines that the packet flow has been assigned tokens (304—YES), the system proceeds to step 306. At 306, the system may apply the long lived flow module 114. In some examples, the long lived flow module takes into account that long lived packet flows may consume less resources (and therefore will need fewer tokens) after time T seconds. For instance, in the first T seconds (e.g., 20 second, 60 seconds, etc.), the packet flow may need 10 tokens (e.g., in order to create a packet flow record and collect information about packet flow attributes). However, after the T seconds (e.g., after 60 seconds, etc.), the packet flow may be designated as a long lived packet flow and will only need to update statistics for the packet flow, thereby consuming less resources (e.g., and therefore will need fewer tokens). Accordingly, the long lived flow module may assume a long lived packet flow will consume K % of the resource consumed by the packet flow in first T seconds, it should return (M×(1-K %)) number of tokens to token bucket by time T seconds. In some examples, if multiple long lived packet flows returned its extra token, the long lived flow module may sample new packet flows when remaining token greater than M. In some examples, the number of active packet flows being sampled may range from (N/M) to (N/(M×K %)), with the system resource usage unchanged. Thus, the long lived flow module may enable more short lived packet flows to be sampled by utilizing an elastic limit. The system may then proceed to step 314 and may exit the algorithm.

Where the system determines that the packet flow has not been assigned tokens (304—NO), the system proceeds to step 308. At 308, the system may apply the application fairness module. In some examples, the application fairness module is configured to determine the hash value of each packet flow the system receives. In some examples, the hash value is based at least in part on the packet flow's attributes (e.g., packet flow tuple, application, etc.). In some examples, the application fairness module may assign, based at least in part on the hash value, the packet flow to a particular token bucket, such that the packet flow may only receive token(s) from the assigned token bucket. In some examples, where there are enough token(s) in the particular token bucket, the packet flow may be sampled. In other examples, such as where there are not enough token(s) in the particular token bucket, the packet flow may not be sampled and/or another module (e.g., such as the missed first packet module) may be applied.

By utilizing multiple token buckets and assigning packet flows to token buckets based on a hash value, packet flows belong to different applications will compete for tokens within their designated token buckets. Therefore, applications with fewer packet flows may have a higher opportunity to be sampled, resulting in improved diversity of packet flow sampling compared to existing sampling mechanisms.

At 310, the system determines whether the tokens(s) associated with a particular token bucket are exhausted. For instance, as described above, the system may comprise multiple token buckets. For instance, the system may separate the total N tokens into L small token buckets, where each token bucket is assigned N/L token(s). As noted above, a token bucket may be exhausted where there are no tokens left to assign or where the tokens are below a threshold value and the number of token(s) is greater than zero. In some examples, the threshold value is automatically set by the system. In other examples, the threshold value may be configurable by a network administrator.

Where the system determines that the token(s) associated with the particular token bucket are not exhausted (310—NO), the system proceeds to step 312. For example, in this example, the token bucket may be determined to be lower than a threshold amount and/or greater than zero. At 312, the system may apply the missed first packet module. As described above, the missed first packet module may be configured to give higher precedence to packet flows where the missed first packet module determines the packet is the first packet in the packet flow. For instance, the missed first packet module may be applied where the number of tokens in a particular token bucket are exhausted (e.g., determined to be below a threshold number of tokens) and the number of token(s) is greater than zero. In this example, the missed first packet module may start a timer for a particular time period, F seconds, (e.g., 10 seconds, 30 seconds, etc.). During the time period, the missed first packet module may be configured to not allow a packet flow to be sampled (e.g., assigned tokens) where the first packet in the packet flow is missed. Where the first packet in the packet flow is received by the system, the missed first packet module may allow the packet flow to be sampled where there are enough tokens in the assigned token bucket. The system may then proceed to step 314 described below.

Where the system determines that the token(s) associated with the particular token bucket are exhausted (310—YES), the system proceeds to step 314. For instance, in this example, the token bucket may be determined to have zero token(s) left. At 314, the system ends and/or exits the algorithm. The system may implement the algorithm each time a packet is received by the device (e.g., monitoring system 108, controller 110, network device 104, etc.).

In some examples, one or more of the variables utilized by the sampling algorithm (N, M, K, T, F, etc.) may be configurable by a user. Accordingly, by enabling a user to adjust one or more parameters of the sampling algorithm, the system provides a customizable intelligent monitoring system that users can customize to their network.

Figure 4:
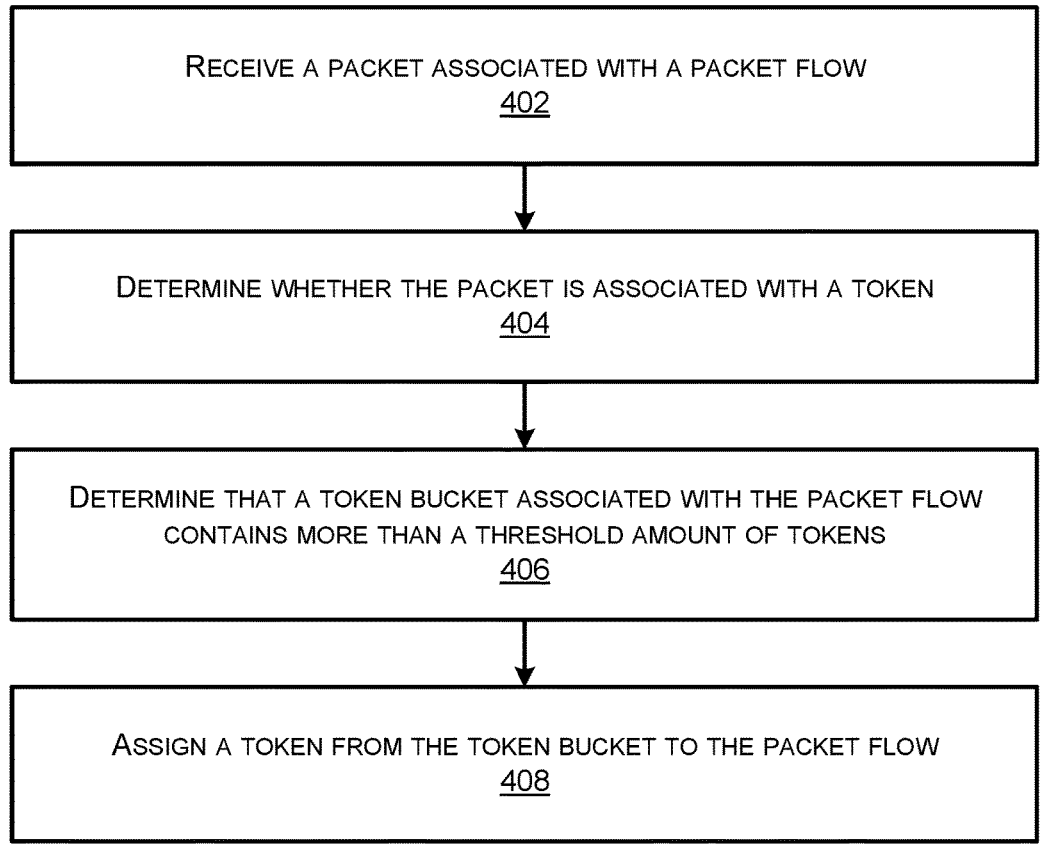
FIG. 4 illustrates a flow diagram of an example method for intelligently sampling packet flow associated with the system described in FIGS. 1-3.

FIG. 4 illustrates a flow diagram of an example system 400 for intelligently sampling packet flows within a network. In some instances, the steps of system 400 may be performed by one or more devices (e.g., monitoring system 108, controller 110, network device(s) 104, etc.) that include one or more processors and one or more non-transitory computer-readable media storing computer-executable instructions that, when executed by the one or more processors, cause the one or more processors to perform operations of system 400.

At 402, the system may receive a packet associated with a packet flow. As noted above, a packet flow may comprise a plurality of packets. In some examples, the packet flow is associated with an application.

At 404, the system may determine whether the packet is associated with a token. For instance, the system may determine whether the packet is associated with a packet flow that has already been assigned token(s). In some examples, the system may identify this association in memory and/or a database of the system. As described above, where the system determines that the packet is associated with a packet flow that has already been assigned token(s), the system may apply the long lived flow module described above. Where the system determines that the packet is not associated with a packet flow that has been assigned token(s), the system may apply the application fairness module identified above. In some examples, the system may further comprise determining a hash value associated with the packet flow and assigning the packet flow to the token bucket based at least in part on the hash value. In some examples, the hash value is based at least in part on attributes associated with the packet flow, the attributes comprising packet flow tuple and application identifier.

At 406, the system may determine that a token bucket associated with the packet flow contains more than a threshold amount of tokens. For instance, the token bucket may be one of a plurality of token buckets. As described above, the system may divide the tokens N between M token buckets. In some examples, the token bucket comprises a fixed number of tokens, wherein the amount of tokens associated with the token bucket is associated with a number of concurrent packet flows being monitored by the network device.

At 408, the system may, assign a token from the token bucket to the packet flow. In some examples, the system may store an association between the token and the packet flow in memory and/or a database of the system.

In some examples, the system may further comprise receiving a second packet associated with a second packet flow, determining that a number of tokens associated with the token bucket is below a threshold amount and, based at least in part on determining the number of tokens is below the threshold amount starting a timer for a predetermined amount of time. In some examples, the system may determine that the second packet flow comprises a first packet and may assign a second token to the second packet flow. In some examples, the system may determine that the second packet flow is associated with a first missed packet; and refrain from assigning a second token to the second packet flow during the predetermined amount of time. For instance, as described above, the system may apply missed first packet module where the number of tokens in a particular token bucket are below a threshold.

Figure 5:
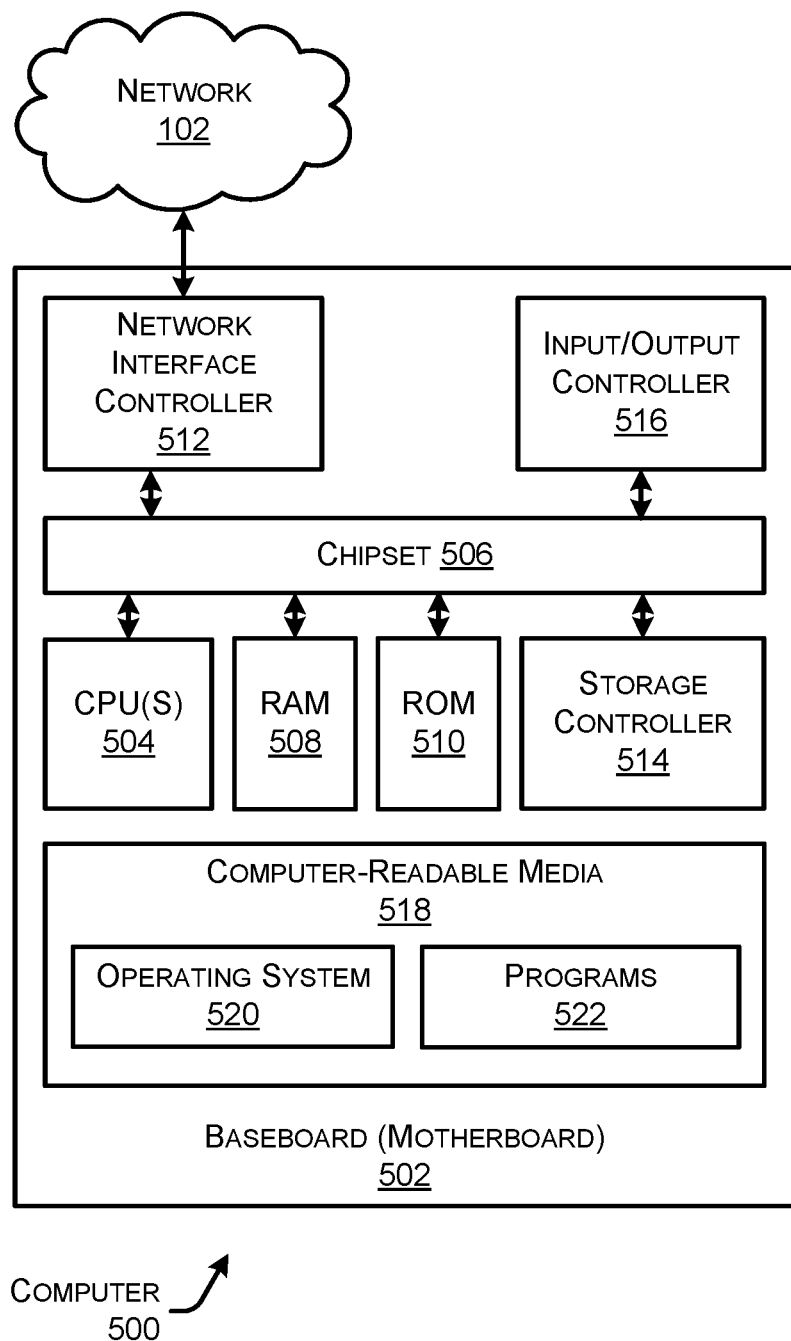
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a monitoring system 108, a controller 110, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the monitoring system 108, the controller 110, and/or any components included therein, may be supported by one or more devices similar to computer 500. Stated otherwise, some or all of the operations performed by the monitoring system 108, the controller 110, and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a monitoring system 108, a controller 110, and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the monitoring system 108, a controller 110, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including: receiving a packet associated with a packet flow within the network;

determining that the packet is not associated with a token;
determining that a token bucket associated with the packet flow comprises tokens above a threshold amount of tokens; and assigning the token to the packet flow.

In this way, the system can implement a token bucket-based packet flow sampling mechanism, which may always retrain system resource usage to a certain limit, thereby restraining the system to a resource limit. Moreover, the system utilizes intelligence in conjunction with the token bucket to (1) ensure the diversity of monitored applications, (2) allow more short-lived packet flows been sampled with elastic limit (3) and give higher precedence to packet flows who can be monitored completely. Accordingly, the described techniques may maximize the insights about application performance, network path(s), and critical events happening in the network that are retrieved from packet flows sampled by network monitoring. Further, the described techniques may enable users (e.g., network administrators, etc.) to adjust the rules and/or parameters to meet the requirements of different scenarios, thereby enabling the system to be customized to a user's network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a network device within a network that monitors packet flow, the method comprising:
   receiving a packet associated with the packet flow within the network;
   determining that the packet is not associated with a token;
   selecting, from a plurality of token buckets of the network device, a token bucket to assign to the packet flow, the token bucket comprising a portion of a total amount of tokens allocated to the network device, the total amount of tokens representing a number of concurrent packet flows the network device is configured to monitor;
   determining that an amount of tokens in the token bucket assigned to the packet flow is above a threshold amount of tokens; and
   assigning, from the token bucket, at least one token to the packet flow.

2. The method of claim 1, wherein determining the token bucket further comprises:
   determining a hash value associated with the packet flow; and
   assigning the packet flow to the token bucket based at least in part on the hash value.

3. The method of claim 2, wherein the hash value is based at least in part on attributes associated with the packet flow, the attributes comprising a flow tuple and an application identifier.

4. The method of claim 1, wherein the total amount of tokens is a fixed amount and restrains an amount of compute resources used by the network device.

5. The method of claim 1, wherein assigning the at least one token to the packet flow comprises assigning multiple tokens, the method further comprising:
   determining that the packet flow is designated as a long lived packet flow;
   determining a threshold time period associated with the long lived packet flow;
   determining, based on the packet flow being designated as the long lived packet flow, a subset of the multiple tokens corresponding to resources consumed by the packet flow during the threshold time period; and
   returning, based on determining the threshold time period has elapsed, the subset of the multiple tokens to the token bucket assigned to the packet flow.

6. The method of claim 1, further comprising:
   receiving a second packet associated with a second packet flow;
   selecting the token bucket to assign to the second packet flow;
   determining that the amount of tokens associated with the token bucket is below the threshold amount; and
   based at least in part on determining the amount of tokens is below the threshold amount:
     starting a timer for a predetermined amount of time;
     determining that the second packet flow comprises a first packet; and
     assigning a second token to the second packet flow.

7. The method of claim 1, further comprising:
   receiving a second packet flow;
   selecting, from the plurality of token buckets, a second token bucket to assign to the second packet flow;
   determining that a number of tokens associated with the second token bucket is below a second threshold amount; and
   based at least in part on determining the number of tokens is below the second threshold amount:
     starting a timer for a predetermined amount of time;
     determining that the second packet flow is associated with a first missed packet; and
     refraining from assigning a second token to the second packet flow during the predetermined amount of time.

8. A system comprising:
   one or more processors; and
   one or more non-transitory computer-readable media storing computer-executable instructions that, when executed by the one or more processors, cause the one or more processors to perform operations comprising:
     receiving a packet associated with a packet flow within a network;
     determining that the packet is not associated with a token;
     selecting, from a plurality of token buckets of a network device, a token bucket to assign to the packet flow, the token bucket comprising a portion of a total amount of tokens allocated to the network device, the total amount of tokens representing a number of concurrent packet flows the network device is configured to monitor;
     determining that an amount of tokens in the token bucket assigned to the packet flow is above a threshold amount of tokens; and
     assigning, from the token bucket, at least one token to the packet flow.

9. The system of claim 8, wherein determining the token bucket further comprises:
   determining a hash value associated with the packet flow; and
   assigning the packet flow to the token bucket based at least in part on the hash value.

10. The system of claim 9, wherein the hash value is based at least in part on attributes associated with the packet, the attributes comprising a flow tuple and an application identifier.

11. The system of claim 8, wherein the total amount of tokens is a fixed amount and restrains an amount of compute resources used by the network device.

12. The system of claim 8, wherein assigning the token to the packet flow comprises assigning multiple tokens, the operations further comprising:
   determining that the packet flow is designated as a long lived packet flow;
   determining a threshold time period associated with the long lived packet flow;
   determining, based on the packet flow being designated as the long lived packet flow, a subset of the multiple tokens corresponding to resources consumed by the packet flow during the threshold time period; and
   returning, based on determining the threshold time period has elapsed, the subset of the multiple tokens to the token bucket assigned to the packet flow.

13. The system of claim 8, the operations further comprising:
   receiving a second packet associated with a second packet flow;
   selecting the token bucket to assign to the second packet flow;
   determining that the amount of tokens associated with the token bucket is below the threshold amount; and
   based at least in part on determining the amount of tokens is below the threshold amount:
      starting a timer for a predetermined amount of time;
      determining that the second packet flow comprises a first packet; and
      assigning a second token to the second packet flow.

14. The system of claim 8, the operations further comprising:
   receiving a second packet associated with a second packet flow;
   selecting the token bucket to assign to the second packet flow;
   determining that the amount of tokens associated with the token bucket is below the threshold amount; and
   based at least in part on determining the amount of tokens is below the threshold amount:
      starting a timer for a predetermined amount of time;
      determining that the second packet flow is associated with a first missed packet; and
      refraining from assigning a second token to the second packet flow during the predetermined amount of time.

15. One or more non-transitory computer-readable media storing computer-readable instructions that, when executed by one or more processors, cause the one or more processors to perform operations comprising:
   receiving, from a device within a network, a packet associated with a packet flow within the network;
   determining that the packet flow corresponds to a long lived packet flow;
   determining that the packet is not associated with tokens;
   selecting, from a plurality of token buckets, a token bucket to assign to the packet flow;
   determining that the token bucket comprises tokens above a threshold amount of tokens;
   assigning multiple tokens to the packet flow;
   determining that a threshold period of time associated with long lived packet flows has elapsed; and
   causing a subset of the multiple tokens assigned to the packet flow to be returned to the token bucket.

16. The one or more non-transitory computer-readable media of claim 15, wherein determining the token bucket comprises:
   determining a hash value associated with the packet flow; and
   assigning the packet flow to the token bucket based at least in part on the hash value.

17. The one or more non-transitory computer-readable media of claim 16, wherein the hash value is based at least in part on attributes associated with the packet flow, the attributes comprising a flow tuple and an application identifier.

18. The one or more non-transitory computer-readable media of claim 15, wherein the token bucket comprises a portion of a total amount tokens allocated to a network device, wherein the total amount of tokens a total number of concurrent packet flows the network device is capable of monitoring based on an amount of compute resources allocated to the network device.

19. The one or more non-transitory computer-readable media of claim 15, the operations further comprising:
   receiving a second packet associated with a second packet flow;
   selecting the token bucket to assign to the second packet flow;
   determining that the amount of tokens associated with the token bucket is below a threshold amount; and
   based at least in part on determining the amount of tokens is below the threshold amount:
      starting a timer for a predetermined amount of time;
      based on determining that the second packet flow comprises a first packet:
         assigning a second token to the second packet flow; or
      based on determining that the second packet flow is associated with a first missed packet:
         refraining from assigning a second token to the second packet flow during the predetermined amount of time.

20. The one or more non-transitory computer-readable media of claim 15, wherein the long lived packet flow comprises a connection that stays open for a time period greater than a predefined period of time, and wherein the subset of the multiple tokens correspond to tokens the packet flow no longer utilizes.

* * * * *